April 20, 1926.
J. S. SMALLEY
1,581,988
MOTOR CAR DRIVE
Filed March 21, 1921    3 Sheets-Sheet 1
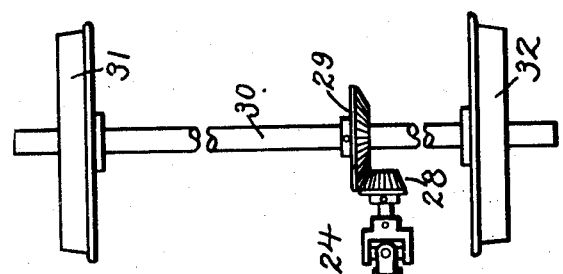
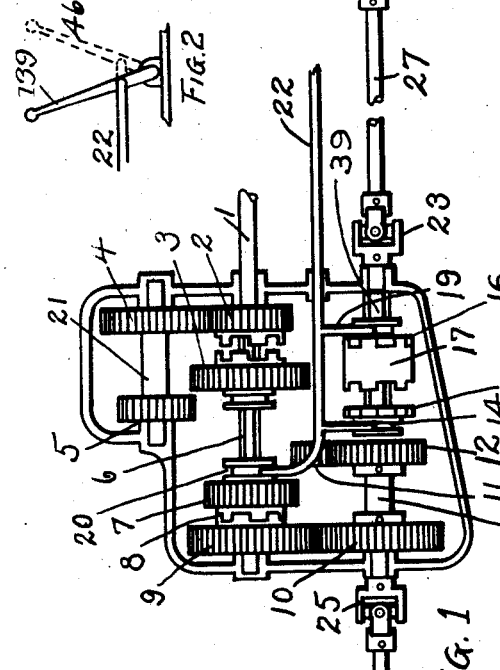
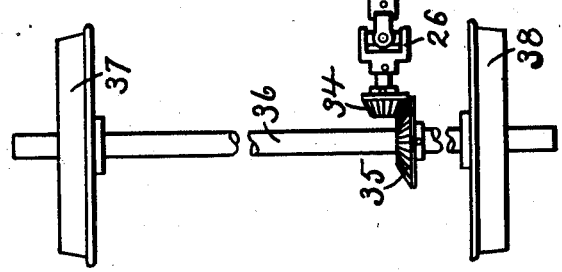
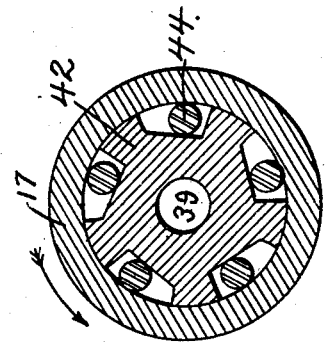
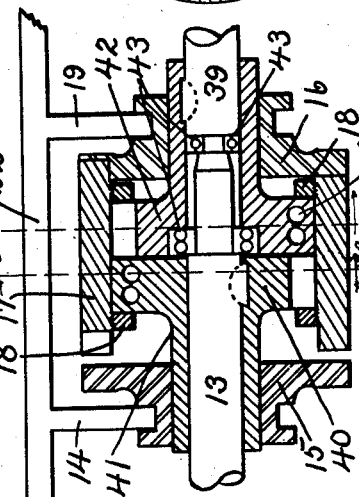
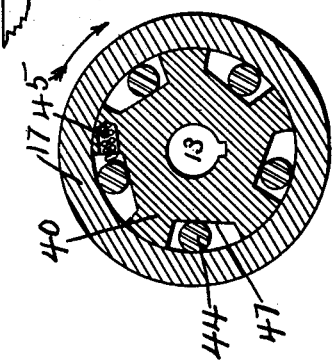
INVENTOR
James Shepard Smalley
ATTORNEYS April 20, 1926.
J. S. SMALLEY
1,581,988
MOTOR CAR DRIVE
Filed March 21, 1921    3 Sheets-Sheet 3
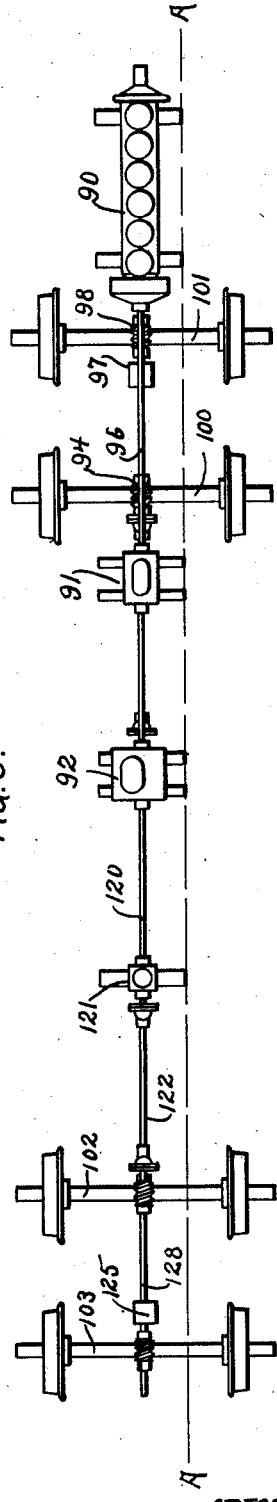
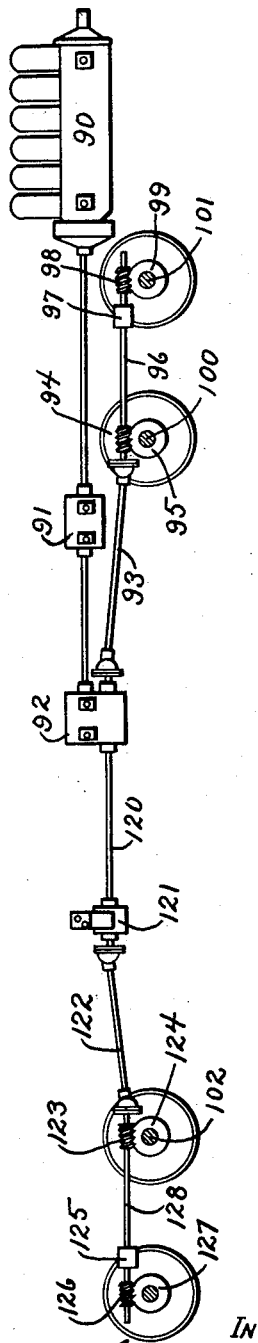
INVENTOR
James Shepard Smalley
ATTORNEYS Alexander Lowell Patented Apr. 20, 1926.

1,581,988

UNITED STATES PATENT OFFICE.

JAMES SHEPARD SMALLEY, OF MUSCATINE, IOWA.

MOTOR-CAR DRIVE.

Application filed March 21, 1921. Serial No. 454,069.

*To all whom it may concern:*

Be it known that I, JAMES SHEPARD SMALLEY, a citizen of the United States, residing at Muscatine, in the county of Muscatine and State of Iowa, have invented certain new and useful Improvements in Motor-Car Drives; and I hereby declare that the following is a full, clear, and exact description thereof, reference being had to the accompanying drawings, which form part of this specification.

This invention is a novel improvement in vehicle driving mechanism and is especially adapted for motor propelled vehicles, such as railway motor cars, automobiles and the like. The principal object of the invention is to enable more than one axle to be used for driving in emergencies, or where greater traction is desired, without the necessity of permanently coupling all the axles together or to the motor or prime mover; and a further object is to have such axle operatively connected and disconnected automatically from the prime mover as may be required by traction conditions.

In the simplest form of the invention as applied say to a four wheel car truck the source of power would be directly connected with one of the axles in the same manner that an automobile or railway motor car truck is usually driven, while the second axle will be indirectly connected with the motor in such manner that the second axle will only come into action when the speed of the first axle exceeds a given ratio of speed relatively to that of the second axle. In other words when there is no slippage of the wheels on the primary driven axle such axle would be the only one driving, the second axle then simply trailing after or being pushed by the first axle; but where the speed of the primary axle exceeds the predetermined ratio of speed between the primary driven axle and the second axle the latter, through suitable connections, is automatically thrown into operative connection with and driven by the motor and then becomes a secondary driving means. My invention however is essentially different from and must not be confused with the ordinary "differential" drive because in the latter if one driver spins the second driver with greater traction need not turn.

I will explain the invention more in detail with reference to the accompanying drawings which, in connection with the explanation will enable others skilled in the art to adapt and use the same. The said drawings however are merely illustrative and not definitive of the invention; and in the claims I have summarized the essentials of the invention and novel features of construction and combination of parts for which protection is desired.

Fig. 1 is a diagrammatic view of a two axle bevel gear drive with an "over-run" clutch located in the transmission and operated by the same shifting rod used to control the forward and reverse gears.

Fig. 2 is the lever for operating the "forward" and "reverse" devices and also the positive jaws of the over-run clutch.

Fig. 3 is a cross-section of one form of double over-run clutch, taken parallel to drive shaft and shifter in forward gear position.

Fig. 4 is a cross-section of such over-run clutch on line 4—4 Fig. 3 looking from the left.

Fig. 5 is a section on the line 5—5 Fig. 3 looking from the left, when the gear shift lever has been shifted into "reverse".

Fig. 9 is a plan view of an eight wheel truck with my novel drive applied thereto.

Fig. 10 is a side elevation of Fig. 9 through line A—A.

Figure 6:
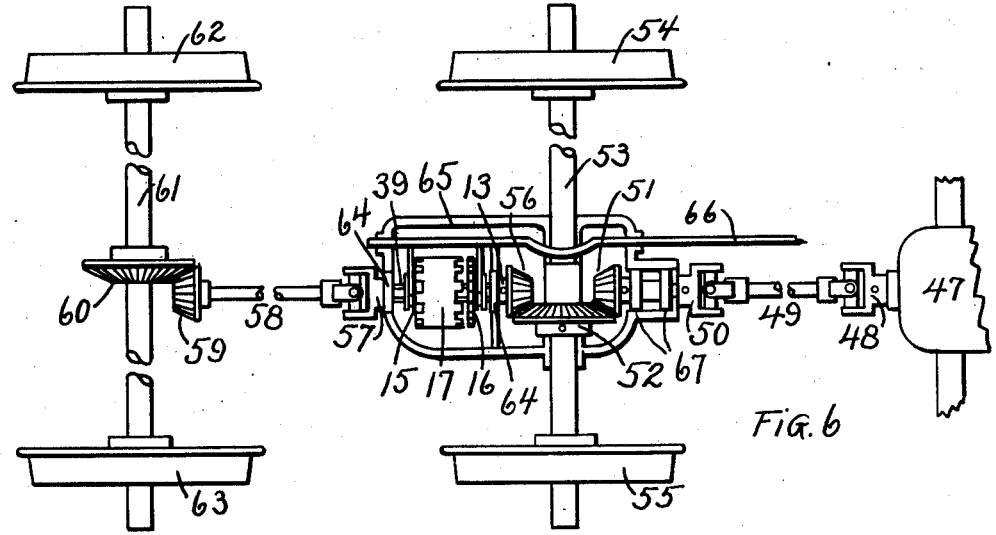
Fig. 6 is a diagrammatical view of a two axle beveled gear drive with one of the axles geared directly to the motor.

It is to be understood that the drawings are merely illustrative of the invention and not definitive.

Referring to Figs. 1 to 5 a shaft 1 is connected to a suitable source of power, such as a steam or explosive engine. 2, 3, 4 and 5 are gears arranged as usual to make a conventional two speed forward and no reverse sliding gear transmission. 6 is a splined shaft for operating the sliding gears 3 and 7. Gear 7 makes positive connection with gear 9 for forward driving; and is disengaged from 9 and slid into mesh with gear 11 for reverse. A positive clutch 8 connects gears 7 and 9. 9 is a gear bushed to turn freely on shaft 6 and continually meshed with gear 10. 10 is keyed to shaft 13 and meshes with gear 9. 11 and 12 are a two train set of gears for reverse; gear 12 being keyed to shaft 13 and a gear 11 is an idler meshing with 12, and meshing with sliding gear 7 for reverse. This driving mechanism is shown diagrammatically and more speeds could be provided for, the particular construction of this driving means forming no part of this invention.

A driven shaft 13 carries part 40 of an over-run clutch (see Fig. 3) rigidly keyed on one end of shaft 13; and the other end of shaft 13 is positively connected by means of universal joints 25 and 26 and intermediate shaft 33, to a bevel pinion 34 which meshes with a bevel gear 35 on an axle 36. 15 is a jaw clutch member sliding on the hexagon shaped hub of 40 and engaging corresponding jaws on 17. A shifter finger 14 is rigidly connected to a gear shifter 22 for shifting 15. A corresponding jaw clutch member 16 is slidably mounted on the hub of a clutch member 42 and is adapted to engage a bushing 17 having clutch teeth formed on each end. A ring 18 is screwed into 17 to hold members 40 and 42 in position therein and also to retain the member 17 in place. A shifter finger 19 is rigidly attached to gear shifter 22 for shifting clutch member 16. Gear 7 has a collar 20 engaged by a finger on the gear shifter 22. 21 is the jackshaft having gears 4 and 5 fastened rigidly to it. The gear shifter 22 can be operated by a lever 139 to move gear 7 for forward or reverse, and at the same time moves 15 and 16 through fingers 14 and 19.

30 and 36 represent the axles and are shown as provided with ordinary car wheels 31, 32 and 37, 38, but the wheels could be ordinary road wheels; and if the invention is applied to automobiles both axles could be provided with the usual differential. The axle 30 carries a gear 29 meshing with a gear 28 connected with couplings 23, 24 and drive shaft 27 to shaft 39, to which clutch member 42 is rigidly connected. The axle 36 has a bevel gear 35 meshing with a pinion 34, which is connected by couplings 25 and drive shaft 33 to a shaft 13.

Figs. 3, 4 and 5 illustrate more in detail the construction of an ordinary over-run clutch, 40 being the inside member of the clutch attached to shaft 13 and having rollers 44, which might be adapted to lock this member to sleeve member 17. Part 40 cannot run faster than sleeve member 17, but the tendency to run faster locks the rollers and makes part 40 drive sleeve 17. The other clutch member 42 is rigidly keyed to shaft 39 and provided with rollers 44 which are adapted to lock this member to the clutch sleeve or bushing 17. 43 are ordinary ball bearings used to keep shafts 13 and 39 in alinement, and 45 represents a spring which may be used to hold the rollers 44 to prevent lost motion. The particular form of over-run clutch employed forms no part of the present invention and is not claimed per se herein.

I have shown the transmission in Fig. 1 in order to show how the power can be taken from two points most convenient to the two driving axles and the location of the over-run clutch in the transmission case with its jaw clutches operated by the same shifter used for forward and reverse gears.

In this construction the bevel gears at axle 30 have a slightly larger ratio than those at axle 36 so that with no wheel slippage drive-shaft 27 turns slightly faster than drive-shaft 33. Keeping this in mind and referring to Figs. 3, 4 and 5, shaft 39 turns in the same direction as shaft 13 and slightly faster than 13. Shaft 39 is keyed to clutch part 42 the hexagon or splined hub of which positively drives sliding jaw clutch 16.

In the forward speed position as shown, 16 is positively engaged with 17 so that 17 turns in same direction as 40 and slightly faster than 40. With 17 turning faster and in the same direction as 40, the rollers 44 do not wedge and only axle 36 is driving the car. As shown in Figs. 3 and 4, sleeve member 17 is positively connected to shaft 27 through sliding jaw clutch 16, clutch member 42, shaft 39, and coupling 23, and since shaft 27 normally turns faster than shaft 33, sleeve member 17 turns faster and in the same direction as part 40, and hence the rollers 44 do not wedge, and part 40 is not driven by sleeve member 17. When however enough wheel slippage of axle 36 is experienced to let the speed of shaft 33 equal the speed of shaft 27, then the rollers 44 will wedge and sleeve member 17 will then drive shaft 27.

Hence when the wheels 37 and 38 slip enough to more than make up the difference of gear ratio of axles 36 and 30, drive-shaft 33 will speed up and reach the speed of drive-shaft 27, clutch part 40 is then turning in the same direction and at the same speed as 17, and the rollers 44 wedge, locking 40 and 17 together and causing axle 30 to drive. Part 40 cannot run faster than part 17, but the tendency to run faster causes the rollers 44 to lock the parts together. As soon however as the slipping of wheels 37 and 38 is overcome enough to let shaft 33 turn more slowly than 27 the over-run clutch releases and only axle 36 drives the car.

If the gear ratio of axles 36 and 30 were made equal and the wheels 31 and 32 were smaller in diameter than wheels 37 and 38 the action on drive shafts 33 and 27 would be the same as described above.

The broad feature of the invention is having drive shafts, as 33 and 27, running normally at different speeds with the slower one driving the car, and when slippage of the wheels attached to this slower shaft allows it to speed up until it overtakes the speed of the other shaft, then the over-run clutch or other equivalent device makes the faster axle a drive axle also, and it helps drive the car until the slipping of the first axle is reduced to a point where the normally slower shaft (as 33) is again slower than the other shaft (as 27).

When transmission is in reverse gear, as shown in Figs. 1 and 5, so that the gear 7 is in mesh with gear 11, the parts 17 and 40 turn in the reverse direction and the action of the overrun clutch must be reversed. Parts 16 and 17 are then disengaged and parts 15 and 17 are engaged making 42 the operating part of the clutch in place of 40. Part 17, being disengaged from part 16, is now positively connected through parts 15 and 40 to shaft 13. For condition of no wheel slippage of axle 36, part 42, is turning faster than and in the same direction as part 17, so that the rollers 44 do not wedge, and hence shaft 13 does not drive shaft 27. If, however, the wheels 37, 38 do slip enough to let shaft 33 overtake shaft 27, then rollers 44 will lock, and part 17 will drive the axle 30.

In the modification shown in Fig. 6 one axle 53 carries a gear 52 meshing with a pinion 51 directly driven from the motor through transmission 47 through the couplings 48 and 50 and connecting shaft 49 and the gear 52 also meshes with the pinion 56 which connects with one of the shafts 13 of the over-run clutch; and the shaft 39 of such clutch is connected by a joint member 57 on rod 58 to a pinion 59 meshing with bevel gear 60 keyed on the other shaft 61.

The ratio of gears 59 and 60 is larger than the ratio of gears 56 and 52. The over-run clutch is the same as in Figure 3 except it is turned the other end first, in both cases shaft 39 being at the end nearest the axle driven by the over-run clutch.

The shifter for the clutch member of the over-run clutch is shown at 66 and is connected with the shifter controlling the transmission reverse gear similar to the method shown in Figs. 1 and 2.

The principle of action of the parts shown in Fig. 6 is the same as in Fig. 1 but in Fig. 6 the positively driven axle 53 is between the motor or source of power and the axle driven through the over-run clutch. This arrangement would be useful in driving both axles of a "pony truck" as used under railway cars.

By superimposing axle 53 Fig. 6 on axle 36 Fig. 1, a three axle drive would be illustrated, one axle positive and the other two driven through over-run clutches. If Figure 6 were turned end for end and axle 53 superimposed on axle 30 an arrangement of four driving axles, and three over-run clutches would be illustrated. This is the general arrangement shown in Figs. 9 and 10 except that worm gears are shown in place of bevel gears.

Figure 7:
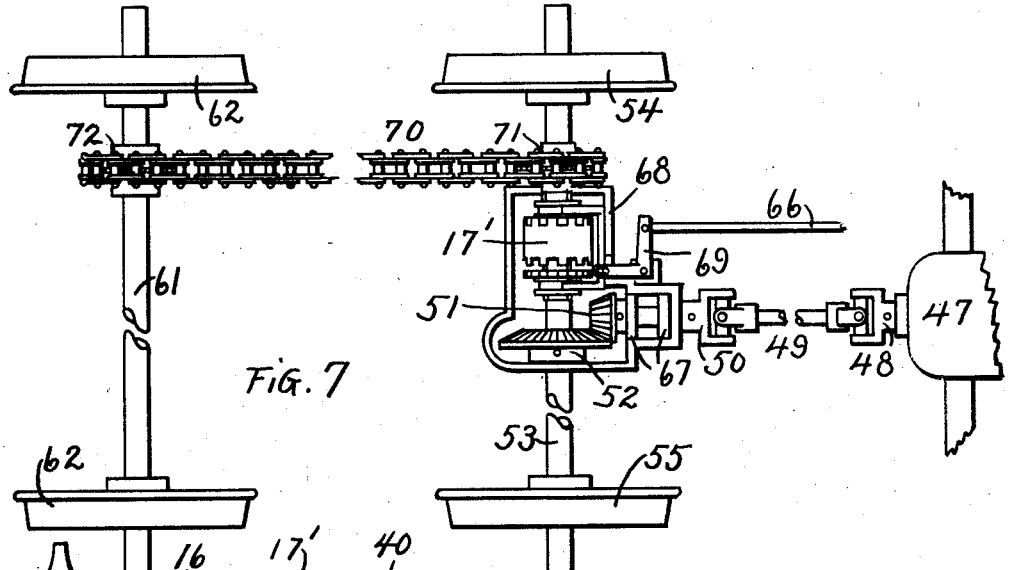
Fig. 7 is a similar view showing one axle geared directly to the motor, and an over-run clutch mounted on such axle, and the power transmitted through the over-run clutch to the second axle by sprocket gearing.
Figure 8:
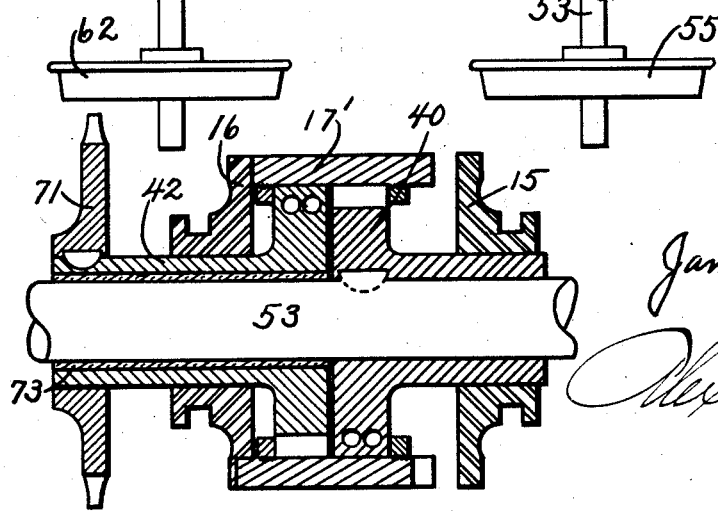
Fig. 8 is a sectional view of the over-run clutch used in Fig. 7.

The construction shown in Fig. 7 is substantially the same as in Fig. 6, but the over-run clutch is mounted upon the axle 53 and power is transmitted from the pinion 71 driven by such over-run clutch to a larger sprocket 72 on the rear axle 61 by means of a sprocket chain 70. The clutch details in this case are modified a little, as shown in cross-section in Fig. 8. Member 42 is not keyed to the shaft but has a bushing 73 and turns freely on axle 53. Member 42 has a longer hub and the chain sprocket 71 is keyed to this hub. Otherwise the clutch shown in Fig. 8 is similar to that shown in Fig. 3.

A double or eight wheel drive is shown in Figs. 9 and 10. In this construction motion is transmitted from the motor 90 through the usual variable gear devices 91 and 92, to a secondary driving shaft 93 which is directly connected by the usual flexible couplings to a worm 94 meshing with a worm gear 95 on one of the axles 100 of the front or right hand truck. The worm shaft 96 extends over to the adjacent axle 101 and is connected by an over-run clutch 97 to the shaft of a worm 98, which meshes with a worm gear 99 on the axle 101, the ratio 98/99 being larger than ratio 94/95 the action of the parts as regards the axles 100 and 101 being the same as in Fig. 6.

The shaft 93 may also be connected to a shaft 120 which is connected by a double over-run clutch 121 to a shaft 122, which in turn is connected by a usual coupling to a shaft carrying a worm 123 which engages a worm gear 124 on the axle 102 of the rear or left hand truck. The shaft 128 of worm 123 is connected by an over-run coupling 125 with the shaft of a worm 126 meshing with a worm gear 127 on the axle 103.

The ratio 126/127 being larger than 123/124, it will be seen in this case axle 101 would not be driven until the wheels and axle 100 slip sufficiently to cause the over-run clutch to come into action; and similarly axle 102 would not be driven until the wheels on both axles 100 and 101 slip; and axle 103 would not come into action until the wheels on axle 102 slip.

*Operation.*

The broad invention should not be confused with mechanical details. For example (referring to Fig. 1) one axle 36 may be permanently connected with the source of power by bevel gears and drive shaft, worm gears and drive shaft or similar device in the same manner as an automobile or road truck is usually driven. The second axle 30 has a gear ratio slightly larger than axle 36 so that for the same axle speed the drive (as shaft 27) connected with axle 30 must have a little higher speed than the drive (as shaft 33) of the driving axle.

Drive shaft 30 is connected to drive shaft 36, or the source of power, through a common form of ratchet or "over-run" clutch. In similar manner a third axle with a gear ratio a little larger than that of axle 30 may be coupled to drive-shaft 30 through an over-run clutch etc. for any number of axles, (see Figs. 9 and 10).

The action of such drive is as follows:

As long as there is no slip to the wheels of axle 36 shaft 27 is driven by axle 30 at a speed higher than shaft 33 proportionate to the difference in the gear ratio of axles 36 and 30. In other words, when there is no slippage of the wheels of axle 36 this axle is the only one driving the car, axle 30 simply trailing and driving its drive shaft as far as the over-run clutch, where on account of the higher speed of shaft 27, the over-run clutch ratchets or runs ahead at a speed depending upon the difference between the two gear ratios. All other additional drive axles would operate in a similar manner.

When the wheels of axle 36 slip an amount proportionately greater than the difference of the gear ratio of axles 36 and 30, then the shaft 33 will speed up and reach the speed of shaft 27 and the over-run clutch between them engages positively and axle 30 becomes a driver as well as axle 36. As soon as the slipping of the wheels of axle 36 is reduced enough so shaft 33 again has a lower speed than shaft 27, the over-run clutch again ratchets and axle 30 drops out as a driver. The same principle of action is used for any number of axles.

Stated in another way, axle 36 drives the car normally. When the axle 36 slips a predetermined amount, axle 30 couples in as a driver etc., and this arrangement and operation can be utilized for any number of axles. As the slipping is overcome the axles drop out of driving action necessarily, one at a time, until only axle 36 is driving, which is the normal condition.

The principle involved in this invention is very simple, that of coupling two or more axles of unequal gear ratio or unequal wheel diameter, to a source of power and placing over-run clutches in the drive of the higher ratio axles, so these axles will not drive until the next lower ratio axle slips or its speed exceeds the normal speed of the higher ratio axle.

The means used to transmit the power is not material, and any kind of transmission means or gearing could be used which can be operated by a positively driven axle or shaft and by suitable connections, such as over-running clutches or suitable devices to transmit motion to another axle or axles to produce the desired action and results aforesaid.

In the claims the word axle is intended to include shaft, except where the axles are referred to as "wheeled."

What I claim is:

1. In apparatus of the character specified, a driven axle; a second axle; means for driving one axle; and means whereby when the speed of the driven axle exceeds the speed of the other axle that also is driven.

2. In combination, a pair of axles; means for driving one of the axles, and connections between the axles including an overrun clutch, whereby when the speed of the driven axle exceeds the speed of the other axle the latter axle is automatically positively actuated by the driving mechanism.

3. In combination, a pair of axles; means for driving one of the axles, and connections between the axles, whereby when the slippage of the wheels attached to the driven axle exceeds the speed of the other axle the latter axle becomes automatically connected with the driving mechanism and also becomes a driver.

4. In mechanism of the character specified, a plurality of axles of unequal gear ratio; means for driving one of these axles directly from a source of power, and connections between the source of power and the other axle, whereby the latter axle will be positively driven in event the driven axle speed exceeds the normal speed of the latter axle.

5. In mechanism of the character specified, a plurality of axles of unequal gear ratio; means for driving the lower geared axle directly from a source of power, and connections between the source of power and the higher geared axle, whereby the higher geared axle while normally running idle will be positively driven if the speed of the lower geared axle exceeds the normal speed of the higher geared axle.

6. In apparatus of the character specified, a plurality of axles; driving means; a lower gear connection between the driving means and the one axle; and a higher gear connection between the driving means and the other axle whereby when the slippage of the wheels attached to the lower geared axle permits it to speed up above the speed of the other axle the higher gear connections become effective to drive the other axle until the slipping of the first axle is overcome.

In testimony that I claim the foregoing as my own, I affix my signature.

JAMES SHEPARD SMALLEY.